United States Patent [19]

Hagenah

[11] Patent Number: 4,773,790
[45] Date of Patent: Sep. 27, 1988

[54] GROUNDCOVERING ELEMENT, ESPECIALLY (CONCRETE) SLAB

[76] Inventor: Gerhard Hagenah, Walter Bertelsmannweg 25, D- 2862 Worpswede, Fed. Rep. of Germany

[21] Appl. No.: 870,476

[22] Filed: Jun. 4, 1986

[51] Int. Cl.⁴ .................................................. E01C 5/06
[52] U.S. Cl. ........................................ 404/41; 404/38; 404/39; 404/42; 52/311; 52/611
[58] Field of Search ..................................... 404/37–39, 404/41, 42; 52/311, 574, 590, 611; 434/96; D25/80

[56] References Cited

FOREIGN PATENT DOCUMENTS

| | | |
|---|---|---|
| 0126507 | 5/1984 | European Pat. Off. . |
| 1912155 | 11/1970 | Fed. Rep. of Germany ........ 404/41 |
| 2227576 | 6/1972 | Fed. Rep. of Germany . |
| 1459739 | 2/1973 | Fed. Rep. of Germany . |
| 2253629 | 7/1974 | Fed. Rep. of Germany ........ 404/41 |
| 2657809 | 6/1978 | Fed. Rep. of Germany ........ 404/41 |
| 8013431 | 5/1980 | Fed. Rep. of Germany . |
| 3116540 | 11/1982 | Fed. Rep. of Germany ........ 404/41 |
| 3426098 | 1/1986 | Fed. Rep. of Germany . |
| 237932 | 6/1945 | Switzerland ......................... 404/41 |

Primary Examiner—Jerome Massie
Assistant Examiner—John F. Letchford
Attorney, Agent, or Firm—Sughrue, Mion, Zinn, Macpeak, and Seas

[57] ABSTRACT

Known groundcovering elements (44) consist of three basic shaped slabs which are connected to form a unit and which are delimited from one another by at least two dummy joints (stem dummy joint 74 and middle dummy joint 81), the peripheral surface having projections (67, 68, 79) and depressions (69, 70, 80) along an (imaginary) base line to form a toothing. To improve the stability and laying of such groundcovering elements (44), it is proposed to make these T-shaped by means of a half-size stem (13) formed approximately centrally on an elongate crossbar (12). When rhombi (45–47) are used as the basic shaped slab, the groundcovering element (44) has the form of an inclined "T".

10 Claims, 7 Drawing Sheets

GROUNDCOVERING ELEMENT, ESPECIALLY (CONCRETE) SLAB

BACKGROUND OF THE INVENTION

The invention relates to a groundcovering element, especially a (concrete) slab.

A known groundcovering element (German patent specification No. 1,459,739), if the projections and depressions are imagined as being omitted, has the form of a cuboid. The bonding effect of this known groundcovering element with adjacent groundcovering elements is obtained as a result of intermeshing by means of the projections and depressions in conjunction with the particular offset in the laying pattern. Because of its elongate shape, this known groundcovering element has a preferred bonding direction, namely in the direction of its longitudinal extension.

To avoid this disadvantage, a further known groundcovering element (German patent specification No. 3,116,540) represents an angular design of the groundcovering element known from German patent specification No. 1,459,739. The angular shape of the groundcovering element is intended, in conjunction with the projections and depressions, to achieve an improved bonding effect with groundcovering elements laid next to it, since the shape itself contributes to the bonding effect, and moreover a meshing length greater than that of the essentially cuboid ground element is obtained.

However, the disadvantage of the angular shape of the groundcovering element known from German patent specification No. 3,116,540 is that the part surfaces forming the angle, as seen in a plan view, are at different distances from one another, thus resulting in a correspondingly irregular transmission of loads into the bed and uneven edge pressure when longitudinal and transverse forces are exerted. If the load direction is unfavourable, there is even the danger that the slab will tilt, that is to say come loose from the bonded structure. This is usually associated with cracks or the like, hence destruction of the slab.

SUMMARY OF THE INVENTION

The object on which the invention is based is, therefore, to provide a covering element of the type mentioned in the introduction, which is distinguished by an increased and, above all, uniform bonding effect for cohesion during laying by means of conventional laying equipment and when laid.

This object is achieved in a surprisingly simple way by means of providing a groundcovering element as a T-shaped concrete slab formed by three basic-shaped slabs, wherein the T-shaped form, as seen in a plan view, is obtained by attaching the stem of the T centrally to the crossbar of the T and by an approximately congruent design of the basic shaped slabs forming the groundcovering element. Consequently, when a load is exerted on the groundcovering element in the longitudinal and transverse directions, an approximately uniform load transmission into the bed is obtained. Edge pressures no longer arise. There is no longer the danger that the groundcovering element, in particular the concrete slab, will tilt, that is to say come loose from the bonded structure. The danger of fracture is also reduced to a minimum as result.

Dummy joints divide the groundcovering element visually, in such a way that it is virtually impossible to detect in the laid surfaces the T-shaped form which is often considered ugly. The middle dummy joint extending approximately centrally and transversely through the crossbar and the transverse dummy joint marking the stem in relation to the crossbar divide each groundcovering element into three approximately equal part surfaces to the onlooker, with the result that, because of an appropriate relative arrangement of the groundcovering elements according to the invention, a multiplicity of laying patterns is possible, without the alignment of the individual groundcovering elements being detectable in the composite structure.

In one embodiment of the invention, the corners of the groundcovering element coincide with the corners of a base line bounding three (imaginary) squares arranged in a T-shaped formation relative to one another. The projections extend beyond this alternately, while the depressions are set back from it, thus forming an approximately zigzag-shaped, meander-shaped or corrugated side face.

In a further especially advantageous embodiment of the invention, the groundcovering element is composed of three (imaginary) rhombi of equal size, which form a base line producing an inclined "T". At the same time, the amount of inclination of the rhombi is preferably selected so that the inclination corresponds to half the length of a side face of the rhombi. This produces, in one direction of the groundcovering made from the groundcovering elements according to the invention, diagonally directed joints which are particularly well suited to absorbing the traffic loads exerted in a longitudinal and transverse direction of the groundcovering. Moreover, the groundcovering element according to the invention can be laid particularly easily in laying units, since, because of the rhombic shape of the base line, there is "bonding toothing" in one direction, while an "open" toothing is obtained in the other (oblique) direction. Consequently, the transverse, free ends of the laying units have a uniform toothing converging outwards, without any undercuts. The laying units consisting of the groundcovering elements according to the invention can thus be laid successively in a simple way, without the otherwise customary need to thread in the laying units to be joined together, which requires a certain skill.

Finally, the groundcovering elements designed according to the invention, because of their rhombic shape, present the observer with a pattern of great variety since the joints or dummy joints do not extend at right angles to one another.

BRIEF DESCRIPTION OF THE DRAWING

Several preferred exemplary embodiments of a groundcovering element according to the invention are explained in more detail below with reference to the drawings. In these.

DETAILED DESCRIPTION OF THE PREFERRED EMBODIMENTS

Figure 1:
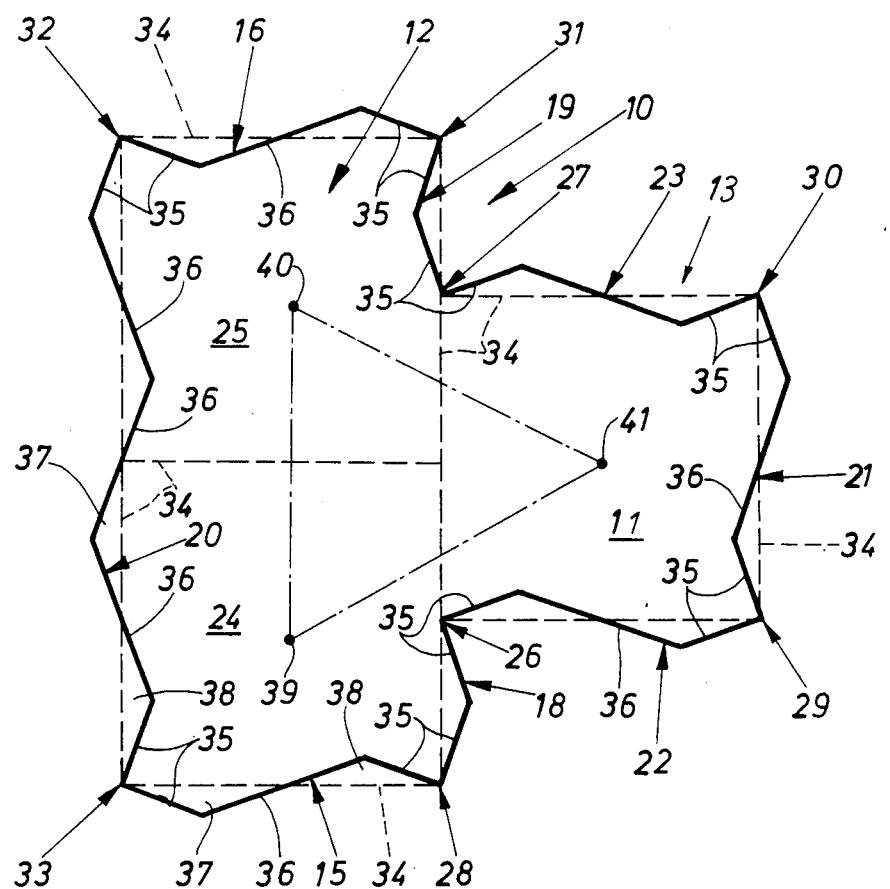
FIG. 1 shows a plan view of a first exemplary embodiment of a groundcovering element, with projections and depressions formed by sloping faces and with a T-shaped form.

FIG. 1 illustrates a groundcovering element 10 which has a peripheral surface with projections 37 and depressions 38 for meshing with groundcovering elements 10 of the same type laid next to it. As seen in a plan view, the groundcovering element 10 has the basic form of a letter "T" and comprises a crossbar 12 and stem 13 attached perpendicularly relative to the latter, the stem 13 being joined to the crossbar 12 centrally. The corners 26 to 33 of the groundcovering element 10 are the corners of a base line 34 which bounds three squares 11, 24, 25 and relative to which alternately the above-mentioned projections 37 project and the depressions 38 are set back, thus forming a zigzag-shaped peripheral surface. The peripheral surface of the crossbar 12 is defined by a longitudinal side face 20 extending in a longitudinal direction of the latter, two longitudinal side portions 18 and 19 extending parallel to this, and two parallel transversely directed transverse side faces 15 and 16. The peripheral faces of the stem 13 are a (short) longitudinal side face 21 extending in a longitudinal direction of the crossbar 12 and two transverse side faces 22 and 23 directed transversely relative to this. The crossbar 12, as seen in a plan view, comprises two (imaginary) squares 24, 25 of equal size, which each correspond to an (imaginary) square 11 of the stem 13, as seen in a plan view. The longitudinal extension of the (short) edge portions 35 adjoining the corners 26 to 33 each correspond to half the longitudinal extension of the remaining edge portions 36 of equal length, which limit the projections 37 and depressions 38, and in the exemplary embodiment illustrated the longitudinal side face 20 of the crossbar 12 facing away from the stem 13 has three (long) edge portions 36. Consequently, when the stem 13 is attached centrally to the crossbar 12, this produces a respectively symmetrical pattern of the longitudinal side portions 18 and 19 of the crossbar 12 which adjoin the two (inner-angle) corners 26 and 27 between the crossbar 12 and the stem 13. Furthermore, the (short) edge portions 35 limiting the (inner-angle) corners 26, 27 are then each of the same length, with a correspondingly equal supporting effect in the region of the (inner-angle) corners 26, 27 when the groundcovering element 10 is subjected to loads in the longitudinal and transverse directions.

The (short) edge portions 35 limiting the corners 26 to 33 each form a right angle, whereas all the other (long) edge portions 36 each form an obtuse, preferably constantly obtuse angle with one another and with the respective adjoining (short) edge portions 35 located in the region of the corners 26 to 23.

FIG. 1 also shows three center points 39, 40 and 41 of the three (imaginary) squares 11, 24 and 25 defining the T-shaped base line of the groundcovering element 10, these center points being connected by dot-and-dash lines. It emerges from this that the center points 39, 40 and 41 of the three squares 11, 24 and 25 of the groundcovering element 10 are each located at an equal distance from one another. This means that, when a load is exerted on the groundcovering element 10, the load transmission into the bed is of equal amount both in the longitudinal direction and in the transverse direction. This reduces considerably the danger that the groundcovering elements 10, when laid, will tilt and come loose from the composite covering structure under loads exerted on the edge regions, for example wheel loads from vehicles driving over them.

Figure 2:
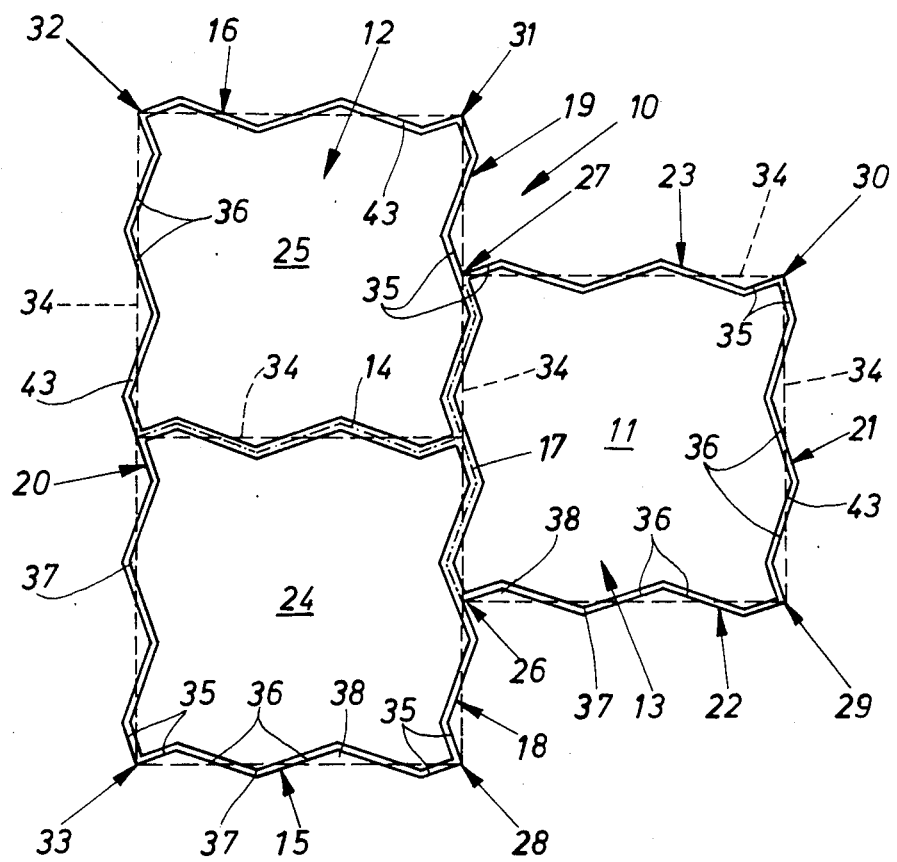
FIG. 2 shows a plan view of a groundcovering element of FIG. 1, but with a modified run of the projections and depressions.

In the exemplary embodiment of FIG. 2, the peripheral surfaces of the groundcovering element 10 have a larger number of (longer) edge portions 36. In particular, here, the longitudinal side face 20 has seven edge portions 36, while the (short) longitudinal side face 21 of the stem 13 and the transverse side faces 15, 16 and 22, 23 each have three edge portions 36. In the groundcovering element 10 according to FIG. 2, the longitudinal side portions 18 and 19 also each have a (long) edge portion 36.

In this embodiment, the transverse side faces 22, 23 of the stem 13 extend parallel to the transverse side faces 15, 16 of the crossbar 12. Such a parallel run is not possible, nor is it provided, in the remaining exemplary embodiments.

Moreover, FIG. 2 also shows the run of the dummy joints, in particular a middle dummy joint 14 and a stem dummy joint 17 on the top side of the groundcovering element 10.

The stem 13 is set off visually from the crossbar 12 by the stem dummy joint 17, and the stem dummy joint 17 continues the run of the longitudinal side portions 18, 19 of the crossbar 12, which laterally adjoin the stem 13 and the two (inner-angle) corners 26, 27 between the crossbar 12 and the stem 13, thus forming a continuous run corresponding to the opposite longitudinal side face 20 of the crossbar 12.

In contrast to this, the middle dummy joint 14 extends on the top side of the crossbar 12 transversely to the longitudinal direction of the latter and has a run which corresponds exactly to the contour of the transverse side faces 15 and 16 of the crossbar 12 which extend parallel to it. The middle dummy joint 14 thereby divides the crossbar 12 visually into two equal halves corresponding to the squares 24 and 25 marking the base line. The dimension and shape of the peripheral surface of the halves of the crossbar 12 which are formed by the middle dummy joint 14 correspond to those of the stem 13. As result, as seen in a plan view, the two halves of the crossbar 12 are congruent relative to the surface of the stem 13.

In principle, it is possible to arrange several dummy joints corresponding to the middle dummy joint 14 on the top side of the crossbar, in such a way that the crossbar 12 has, on its top side 2, dummy joints which extend transversely relative to its longitudinal direction and which, starting from the two (inner-angle) corners 26, 27 between the crossbar 12 and the stem 13, each continue exactly or substantially the run of the two transverse side faces 22 and 23 of the stem 13 which respectively adjoin the two corners 16, 17.

In a way known per se, the depth of the dummy joints (middle dummy joint 14 and stem dummy joint 17) is approximately 10–30% of the thickness of the groundcovering element 10. Furthermore, the upper edges of the peripheral faces (transverse side faces 15, 16, longitudinal side portions 18, 19, longitudinal side face 20, 21 and transverse side face 22, 23) are preferably provided with a continuous chamfer 43 shown in FIG. 2. Accordingly, the cross-section of the dummy joints (middle dummy joint 14 and stem dummy joint 17) is made approximately V-shaped in a corresponding way.

In a similar way to the illustration shown in FIG. 2, the groundcovering element 10 according to FIG. 1 can also be provided with a middle dummy joint and a stem dummy joint, but with a run matching the dimensions and toothing of the peripheral faces.

Figure 3:
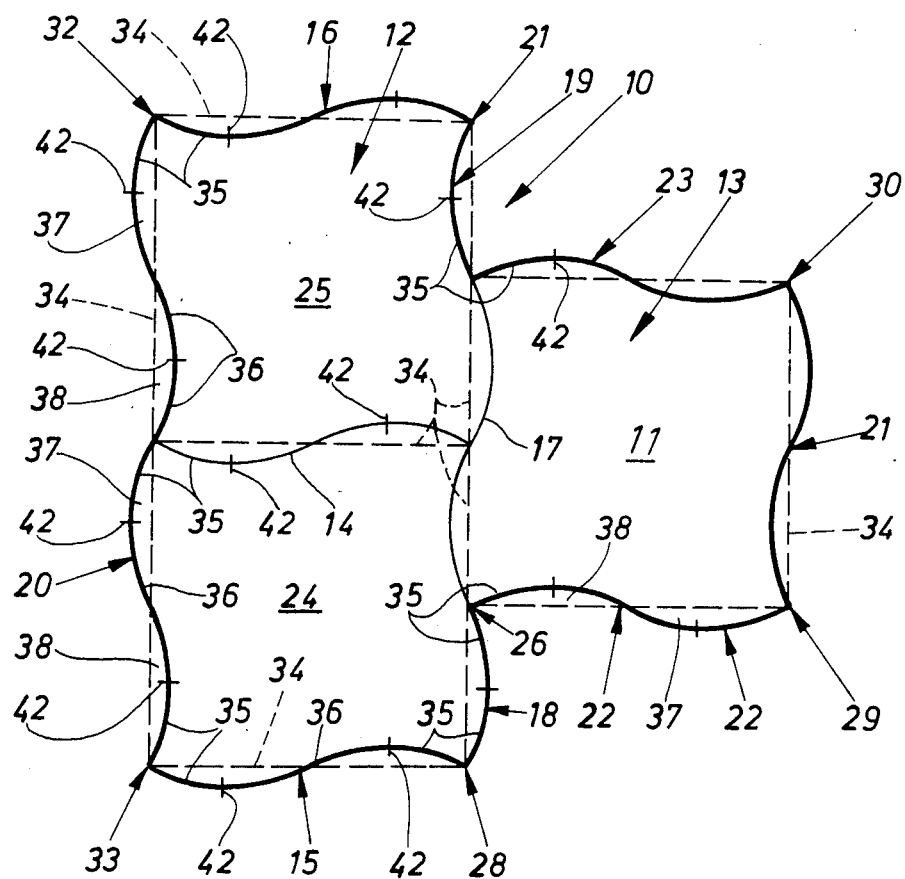
FIG. 3 shows a plan view of a groundcovering element corresponnding to that of FIG. 1, but with rounded projections and depressions.

The embodiment according to FIG. 3 corresponds essentially to that according to FIG. 1, but with the difference that the run of the peripheral faces of the groundcovering element 10 is made corrugated, specifically preferably sinusoidal. The same applies to the middle dummy joint 14 and the stem dummy joint 17 which are matched to the run of the peripheral faces. The (short) edge portions 35 arranged in the regions of the corners 26 to 33 and the (longer) edge portions 36 arranged between them are set off from one another by auxiliary lines 42 in FIG. 3. Of course, these auxiliary lines 42 are not present in the groundcovering elements 10 according to FIG. 3 which are actually produced. They are merely intended to show that, even in the embodiment illustrated in this Figure, the same basic principle is used as in the embodiments according to FIGS. 1 and 2 as regards the dimensions and formation of the peripheral lines and dummy joints. In order to illustrate the auxiliary function of the auxiliary lines 42, these are not marked at all the possible points in FIG. 3.

Of course, as regards the number of corrugated projections 37 and depressions 38, the exemplary embodiment according to FIG. 3 can have a design corresponding to that of the exemplary embodiment according to FIG. 2, specifically with a shorter corrugation length. To that extent, the possibility of variation is not restricted to the groundcovering elements 10 described.

In the embodiments illustrated, all the particular transverse side faces 15, 16 and 22, 23 arranged opposite one another, the middle dummy joint 14, the longitudinal side faces 20 and 21, the longitudinal side portion 18 and 19 and the stem dummy joint 17 can be made to overlap one another by shifting them in parallel. As result, a visually uniform impression is given in the bonded structure.

FIGS. 4–7 show a groundcovering element 44 which represents a further embodiment of the invention with particularly favourable bonding and handling properties.

The groundcovering element 44 is also composed of three basic shaped slabs which are grouped together in a T-shaped formation. However, the most important difference between this exemplary embodiment and the preceding ones is that the T shape is not obtained from three (imaginary) squares joined together, but from three equal rhombi 45, 46, 47. In this exemplary embodiment, these are combined in such a way that they form an inclined "T".

Here, the peripheral faces of the groundcovering element 44 have a toothing consisting of alternately successive projections and depressions. The projections and depressions of this exemplary embodiment are formed in a similar way to those of the exemplary embodiments of FIGS. 1 and 2, in particular from edge portions 51–54 converging at an obtuse angle or at right angles. Consequently, the peripheral faces of the groundcovering element 44 extend both inside and outside the (imaginary) rhombi 45–47.

In comparison with the embodiments described above, the edge portions 50, etcetera, have a more complex run with few regularities. According to the invention, this run conforms to an interrelationship which can be described simplest by two further (enveloping) rhombi, in particular an inner rhombus 55 and an outer rhombus 56. The inner rhombus 55 is obtained by a (subsidiary) connection of all the vertices 57 of the depressions of each basic shaped slab. In contrast to this, the outer rhombus is obtained by a subsidiary connection of all the tips 58 of the projections of each basic shaped slab which are formed on the peripheral face of the groundcovering element 44. The outer rhombi 56 and inner rhombi 55 are likewise inclined, that is to say their respective side faces located opposite one another extend parallel to one another and are at the same distance from one another all round.

In comparison with the inner rhombus 55 and the outer rhombus 56, the rhombi 45–47 have a larger enclosed acute angle, preferably an angle of 60° in comparison with an angle of 50° for the inner rhombus 55 and the outer rhombus 56. As a result, two diagonally opposite corners of the rhombi 45–47 are located outside the region of the outer rhombus 56, while the other two corners of the rhombi 45–47, likewie located opposite one another, come to rest in the region between the outer rhombus 56 and the inner rhombus 55. In spite of these different enclosed acute angles, all the rhombi (rhombus 45–47, inner rhombus 55 and outer rhombus 56) meet at a common point, in particular the center points 59, 60 and 61 of the basic shaped slabs of the groundcovering element 44.

If the three center points 59 . . . 61 of the individual basic shaped slabs of the groundcovering element 44 are connected by means of (imaginary) auxiliary lines 62, a right-angled triangle with one leg extending longitudinally and one leg extending transversely relative to the longitudinal direction of the crossbar 12 is formed. Accordingly, the hypotenuse of this (auxiliary) triangle is at approximately 45° to the longitudinal direction of the groundcovering element 44.

The actual run of the peripheral faces of the groundcovering element of this exemplary embodiment exhibits two basic meshing principles. According to these, the longitudinal side face 63 extending in the longitudinal direction of the crossbar 12, the opposite longitudinal side portions 64 and 65 interrupted by the stem 13, and a short longitudinal side face 66 each have a synchronic toothing composed of a trapezoidal projection 67 and a triangular projection 68. Between the different projections 67 and 68 are formed corresponding depressions 69 and 70. Here, the trapezoidal projection 67 has a short edge portion 50 and a longer, but flatter edge portion 51. The triangular projection 68 is composed of edge portions 50 and 51 of the same size and directed at the same angle. In the present exemplary embodiment, the (long) longitudinal side face 63 of the crossbar 12 has two trapezoidal projections 67 and two triangular projections in alternating sequence. At the same time, the corners 71, 72 and 73, to which a trapezoidal projection 67 is assigned, are each preceded, between the respective corners 71–73 and projections 67, by a (plane) edge portion 52 in the longitudinal direction of the crossbar 12. This corresponds in length to the likewise plane, short base of the trapezoidal projection 67.

In the way described above, a stem dummy joint 74 also present in this exemplary embodiment is formed to delimit the stem 13 from the crossbar 12. As result, the stem dummy joint 74 visually continues the run of the longitudinal side portions 64, 65 or connects the two, in such a way that a toothing matching the outer longitudinal toothing of the crossbar 12 is obtained on the surface of the groundcovering element 44 to an observer. The toothing direction between the longitudinal side of the crossbar 12 directed away from the stem 13 and the toothing formed by the longitudinal side portions 64, 65 of the stem dummy joint 74 are opposite to one another here. In contrast to this, the toothing on the short longitudinal side face 66 of the stem 13 is again designed so that it can be made to overlap with the toothing directed towards the stem 13 and located on the crossbar 12 by being shifted in parallel.

In the present exemplary embodiment, the toothing on the transverse peripheral faces, in particular the transverse side faces 75 and 76 of the crossbar 12 and the transverse side faces 77 and 78 of the stem 13, consists solely of triangular projections 79 and corresponding depressions 80 located between them. At the same time, as here, three projections 79 and two depressions 80 located between them can be arranged on each transverse side face 75-78. Here, the projections 79 are each composed of a short edge portion 53 and a long edge portion 54 of lower inclination. Altogether, each transverse side face 75-78 has three short edge portions 53 and two long edge portions 54.

The run of the toothing formed from the edge portions 53 and 54 on the transverse side faces 75-78 extends in the same direction here, that is to say transverse side faces 75 or 76 and 77 or 78 located opposite one another can be made to overlap.

The crossbar 12 composed of two rhombi 46 and 47 is divided here (centrally) by a middle dummy joint 81, the run of which corresponds to that of the edge portions 53 and 54 on the transverse side faces 75-78. This gives the observer the impression that the groundcovering element 44 is composed of three lozenge-shaped basic slabs of equal size.

At the corners 71-73, two short edge portions 52 and 53 meet one another at right angles, specifically in a longitudinal and transverse direction relative to the longitudinal direction of the crossbar 12. Two (short) edge portions 52 and 53 also meet at right angles at each of two (inner) corners 82 and 83, as regards the corner 83 these being the edge portions 52 and 53 of the middle dummy joint 81 and stem dummy joint 74 which meet at right angles.

Because of the special design of the toothing as described above, the corners 71-73 and 82, 83 already mentioned do not coincide with the corresponding corners of the imaginary rhombi 45-47. The same applies to the remaining corners 84-87, which are likewise located outside the base line formed by the rhombi 45-47, that is to say are not located at the corners of this base line. However, the particular corners 71, 83; 72, 88; 73, 82 located diagonally opposite one another coincide with corresponding corners of the inner rhombi 55, which is not true of the remaining corners 84, 85 and 86.

Figure 5:
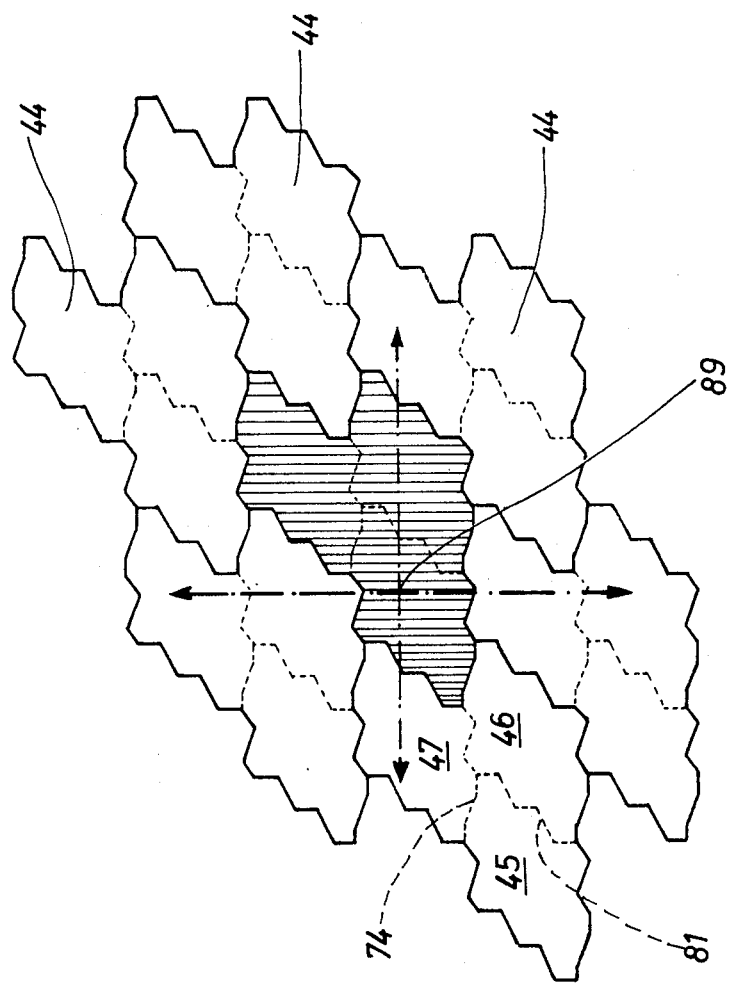
FIG. 5 shows a plan view of a plurality of groundcovering elements according to FIG. 4 which are laid together.

FIG. 5 illustrates seven assembled ground elements 44, their middle dummy joints 81 and stem dummy joints 74 being represented by broken lines. Consequently, the peripheral faces of the individual groundcovering elements 44 can be distinguished clearly from the corresponding dummy joints (stem dummy joints 74 and middle dummy joints 81). In this Figure, a system of coordinate axes 89 marks the main load directions running at right angles to one another. It emerges clearly from this that, particularly because of the transverse side faces 75-77 extending obliquely relative to the system of coordinate axes 89, the forces exerted in the two main load directions are absorbed in the most effective way possible. For example, equal loads can thereby be transmitted by the toothing of the groundcovering elements 44 both in the longitudinal direction and in the transverse direction.

Figure 4:
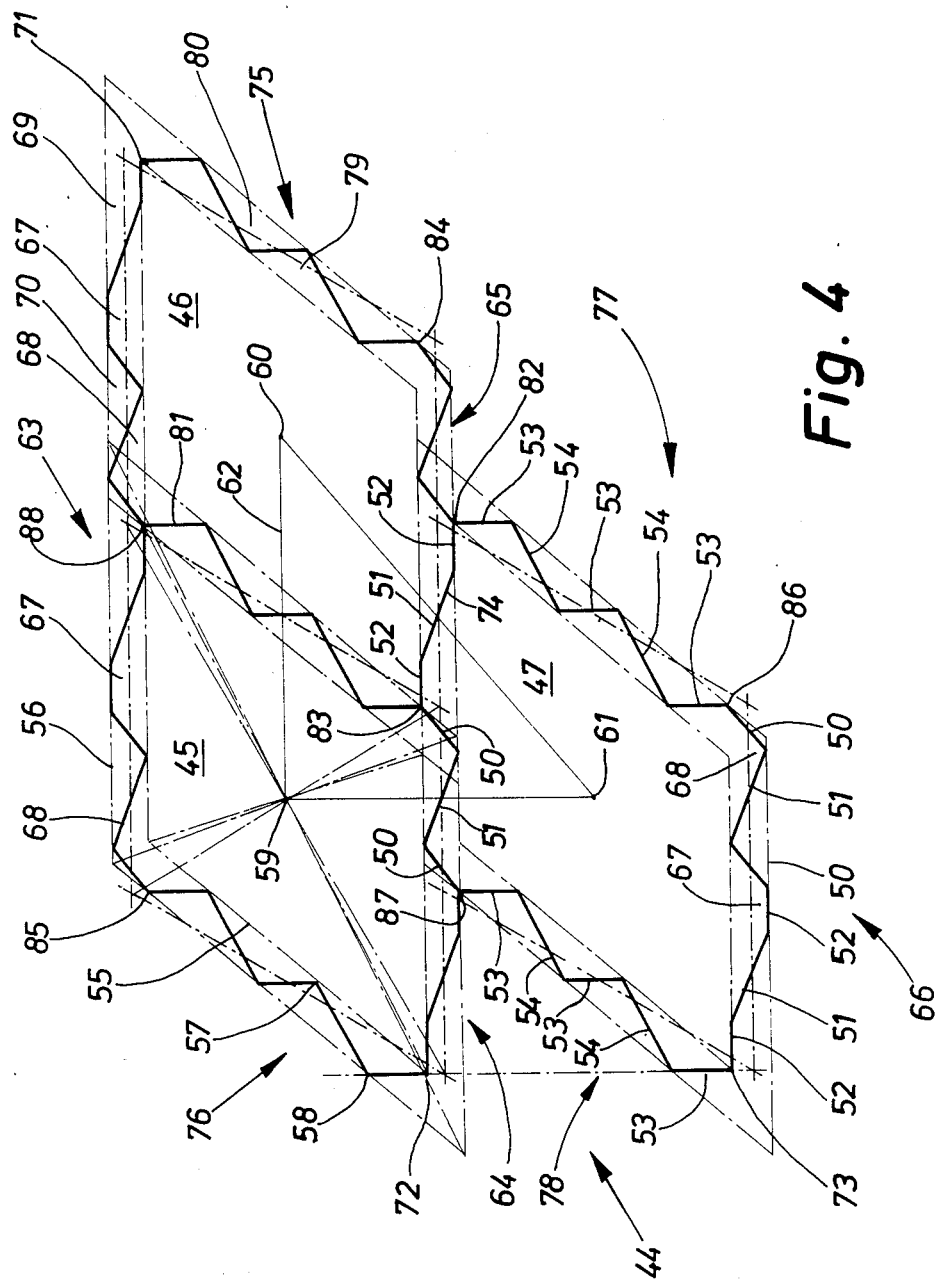
FIG. 4 shows a plan view of a second exemplary embodiment of the groundcovering element, with projections and depressions formed by sloping faces and with a shape corresponding to an inclined "T"
Figure 6:
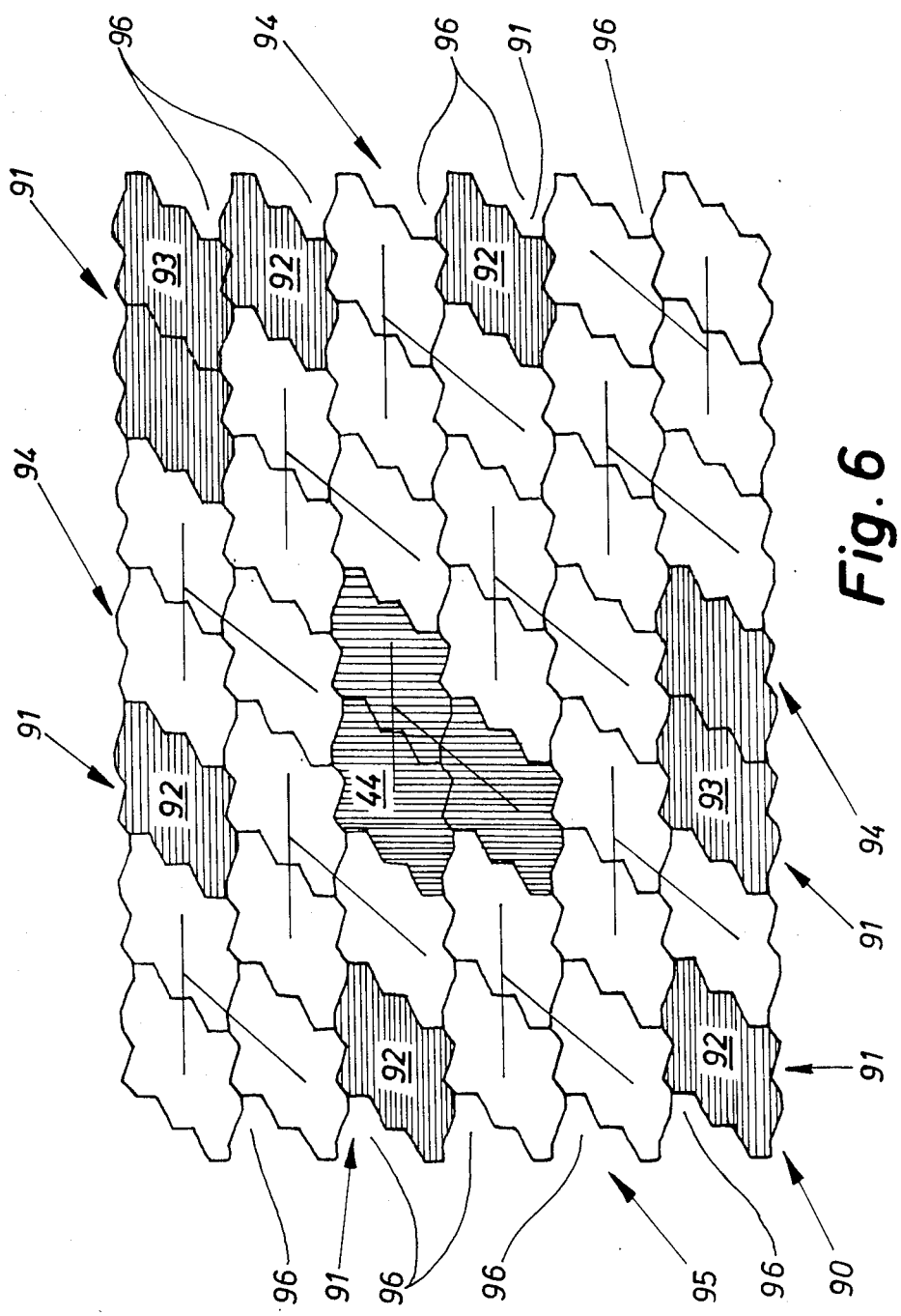
FIG. 6 shows a plan view of a laying unit consisting of groundcovering elements according to FIG. 4.

FIG. 6 illustrates a laying unit consisting of a plurality of groundcovering elements 44 of FIG. 4. The laying unit 90 is obtained in one production cycle in a slab forming machine, with maximum utilization of a conventional board as a base. Such a laying unit 90, in order to be laid by means of a laying machine, is grasped on the longitudinal sides by an appropriately designed clamp or clamping jaws and is both transported and laid as a unit.

Since it is not possible to compose from the groundcovering elements according to the invention a laying unit 90 which is as close to the rectangular form as it should be the gaps 91 arising as a result of the T shape of the individual groundcovering elements are filled with individual slabs 92 having the base surface of a basic shaped slab or else by double slabs 93 corresponding approximately to a crossbar 12. This results, on the longitudinal sides 94 of the laying unit 90, in a surface merely interrupted by individual depressions 69 or 70 which offer sufficient engaging surfaces for clamps or the like of the laying equipment.

As a result of the special design according to the invention of the toothing, the end transverse edges 95 of the laying unit 90 have mouth-shaped outward-converging recesses 96 on the groundcovering elements 44, specifically both in the longitudinal direction and in the transverse direction of these, between basic shaped slabs lying next to one another. At these recesses 96, the edge portions 53 are directed transversely and the edge portions 52 are directed longitudinally. In contrast, the remaining edge portions 51 and 54 are inclined in the recess 96, specifically in a direction opening outwards. Thus, the recess 96 does not have any undercuts, so that it is possible to join individual laying units 90 to one another easily.

Figure 7:
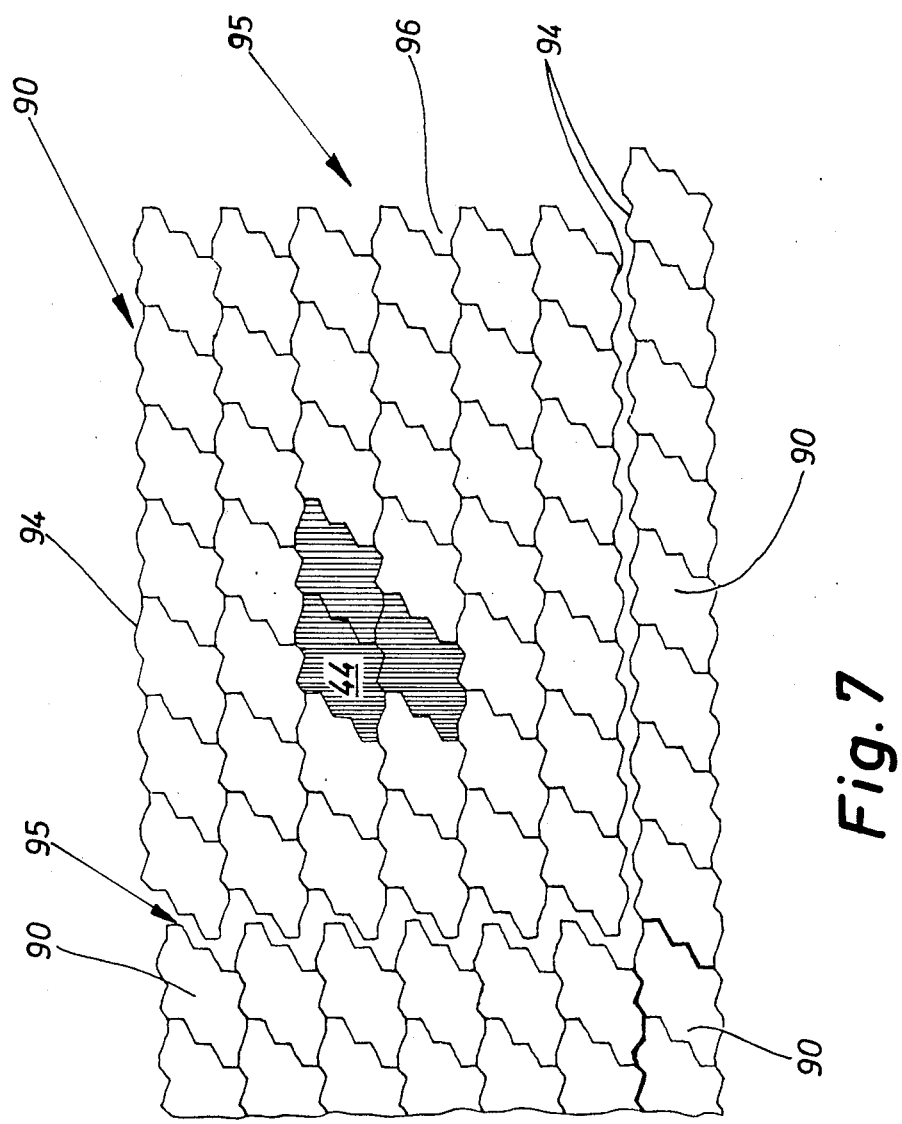
FIG. 7 shows a plan view of the insertion of a laying unit according to FIG. 6 into laying units already laid.

FIG. 7 shows clearly how a laying unit 90 can be pushed into a corner already formed by three laid units, without having to be threaded in. According to this, the laying unit 90, at a short distance from the longitudinal sides of the already laid units, is first moved towards the front laying unit, until the edges of the front transverse edge portions 53 approximately touch one another, that is to say the laying unit to be laid half extends into the recesses 96. Subsequently, the laying unit 90, as result of a superimposed longitudinal movement and transverse movement, with its longitudinal edge 94 and its transverse edge 95 is pushed up against the already laid laying units "until it stops".

What is claimed is:
1. A concrete groundcovering element (10, 44), comprising:
   at least three basic identically shaped slabs which are connected to one another to form a T-shaped unit composed of:
      a longitudinal crossbar (12) formed by two equiaxially arranged ones of said three basic shaped slabs; and
      a stem (13) arranged approximately centrally transversely relative to said crossbar (12), and includ- ing a third one of said three basic shaped slabs; and at least two dummy joints which delimit said three basic shaped slabs from one another, and comprising:

a longitudinal dummy stem joint (17, 74) which extends between the step (13) and crossbar (12) and connects longitudinal side portions (18, 19) of the crossbar (12) to one another; and a middle dummy joint (14, 81), passing approximately centrally through the crossbar (12), and extending transversely to the longitudinal direction of the crossbar (12); and wherein:

said T-shaped unit has eight corners (26–33);

each of said basic shaped slabs has peripheral faces composed of slab edge portions (35, 36) which are of only two different lengths and which define projections (37, 67, 68, 79) and depressions (38, 69 79, 80) forming a toothing;

short ones (35) of said edge portions adjoin said corners (26–33), have approximately half the length of longer ones (36) of said edge portions located between the short ones, and include a right angle between them; and each of said longer edge portions (36) forms the same obtuse angle with adjoining short edge portions (35) and with adjoining longer edge portions (36).

2. A groundcovering element as claimed in claim 1, wherein the basic slabs are three basic squares (11, 24, 25) of equal size, which are arranged in a T-shaped formation having peripheral sides which meet at, and coincide with, the corners (26–33) of the peripheral faces, the projections (37) and the depressions (38) extending alternately on said peripheral sides of the squares (11, 24, 25) in a zigzag-shaped, corrugated or meander-shaped manner.

3. A groundcovering element as claimed in claim 1, wherein said T-shaped unit has longitudinal side faces (20, 21) which extend in the longitudinal direction of the crossbar (12) and which have an odd number of said longer edge portions (36).

4. A groundcovering element as claimed in claim 1, wherein the middle dummy joint (14) extends parallel to transverse peripheral faces of said slabs, and the stem dummy joint (17) extends parallel to longitudinal peripheral faces of said slabs.

5. A groundcovering element as claimed in claim 4, wherein all the opposing longitudinal peripheral faces (20, 21) and longitudinal side portions (18, 19) extend parallel to the stem dummy joint (17) on the one hand, and the transverse side faces (15, 16, 22, 23) and the middle dummy joint 14), on the other hand, extend parallel to one another.

6. A groundcovering element as claimed in claim 1, wherein the three basic shaped slabs are rhombi (45, 46, 47) of equal size which are arranged in an inclined T-shaped formation in such a way that they produce an inclined "T".

7. A groundcovering element as claimed in claim 6, wherein the amount of inclination of each rhombus (45, 56, 47) corresponds approximately to half the side length of each rhombus.

8. A groundcovering element as claimed in claim 6 or 7, wherein the toothing formed by the depressions (69, 70, 80) and projections (67, 68, 79) extends in opposite directions on peripheral faces located opposite one another.

9. A groundcovering element as claimed in claim 8, wherein all tips (58) of the projections (67, 68, 79) of the inclined T-shaped formation are location on a common auxiliary outer inclined T-shaped formation, and all the vertices (57) of the depressions (69, 70, 80) are located on a common auxiliary inner inclined T-shaped formation, said outer inclined T-shaped formation being formed by three outer auxiliary rhombi on each of which are located the tips (58) of a respective one of said three basic shaped slabs, said inner inclined T-shaped formation being formed by three inner auxiliary rhombi on each of which are located the vertices (57) of a respective one of said three basic shaped slabs, and wherein, for each basic shaped slab, the diagonals of the basic rhombus (45–47), auxiliary inner rhombus (55) and auxiliary outer rhombus (56) all intersect approximately at a common center point (59, 60, 61) of said each basic shaped slab.

10. A groundcovering element as claimed in claim 7, wherein the longitudinal side faces (63, 68) and the stem dummy joint (74) are each formed from a trapezoidal and a triangular projection (67, 68), succeeding one another alternately, and corresponding depressions (69, 70), these each having a longer and a shorter edge portion (50, 51), and the shorter edge portions (50) extending parallel to one another are inclined to a greater extent than the likewise parallel longer edge portions (51).

* * * * *

UNITED STATES PATENT AND TRADEMARK OFFICE
CERTIFICATE OF CORRECTION

PATENT NO. : 4,773,790
DATED : September 27, 1988
INVENTOR(S) : Gerhard Hagenah

It is certified that error appears in the above-identified patent and that said Letters Patent is hereby corrected as shown below:

On the title page Insert:

-- [73] Assignee: SF-Vollverbundstein-Kooperation GmbH
Bremen, West Germany --

Signed and Sealed this

Twenty-third Day of May, 1989

Attest:

DONALD J. QUIGG

Attesting Officer

Commissioner of Patents and Trademarks